United States Patent
Sacks et al.

(10) Patent No.: US 6,377,413 B1
(45) Date of Patent: Apr. 23, 2002

(54) METHOD AND APPARATUS FOR ENCODING IDENTIFICATION INFORMATION ON A MAGNETIC DISC

(75) Inventors: Alexei H. Sacks, Edina, MN (US); Li-Ping Wang, Fremont; Donald E. Curtiss, Los Gatos, both of CA (US)

(73) Assignee: Seagate Technology LLC, Scotts Vally, CA (US)

(*) Notice: Subject to any disclaimer, the term of this patent is extended or adjusted under 35 U.S.C. 154(b) by 0 days.

(21) Appl. No.: 09/425,576

(22) Filed: Oct. 22, 1999

Related U.S. Application Data

(60) Provisional application No. 60/126,390, filed on Mar. 26, 1999.

(51) Int. Cl.[7] .............................. G11B 5/09; G11B 5/02
(52) U.S. Cl. ............................. 360/48; 360/25; 360/59; 360/135; 29/603.03; 29/603.09
(58) Field of Search ................. 360/48, 25, 31, 360/58, 135, 53; 29/603.03, 603.09

(56) References Cited

U.S. PATENT DOCUMENTS

| | | | |
|---|---|---|---|
| 4,466,004 A | * | 8/1984 | Kobayashi et al. ........ 346/74.4 |
| 4,679,103 A | | 7/1987 | Workman .................... 360/77 |
| 4,833,662 A | * | 5/1989 | Yoda .......................... 369/13 |
| 4,954,907 A | | 9/1990 | Takita ...................... 360/78.07 |
| 5,089,775 A | | 2/1992 | Wilson ....................... 318/560 |
| 5,117,408 A | | 5/1992 | Weispfenning et al. ....... 369/32 |
| 5,136,439 A | | 8/1992 | Weispfenning et al. .. 360/77.08 |
| 5,210,672 A | * | 5/1993 | Ivers et al. .................. 360/135 |
| 5,345,342 A | | 9/1994 | Abbott et al. ................. 360/48 |
| 5,576,906 A | | 11/1996 | Fisher et al. ............. 360/77.08 |
| 5,602,692 A | | 2/1997 | Freitas et al. ............ 360/77.08 |
| 5,825,579 A | | 10/1998 | Cheung et al. .......... 360/77.08 |
| 5,867,341 A | | 2/1999 | Volz et al. ............... 360/77.08 |
| 5,987,562 A | * | 11/1999 | Glover ........................... 711/4 |

FOREIGN PATENT DOCUMENTS

| | | |
|---|---|---|
| EP | 0 262 690 | 4/1988 |
| EP | 0 420 439 | 4/1991 |
| EP | 0798704 | 3/1997 |
| WO | WO 97/28529 | 8/1997 |

* cited by examiner

Primary Examiner—David Hudspeth
Assistant Examiner—Dan I. Davidson
(74) Attorney, Agent, or Firm—Westman, Champlin & Kelly, P.A.

(57) ABSTRACT

A method and apparatus for processing a magnetic disc prior to assembly of the disc in a disc drive storage assembly includes measuring a physical characteristic of the magnetic disc and encoding an information pattern within the magnetic disc. The information pattern is associated with the measured physical characteristic.

20 Claims, 10 Drawing Sheets

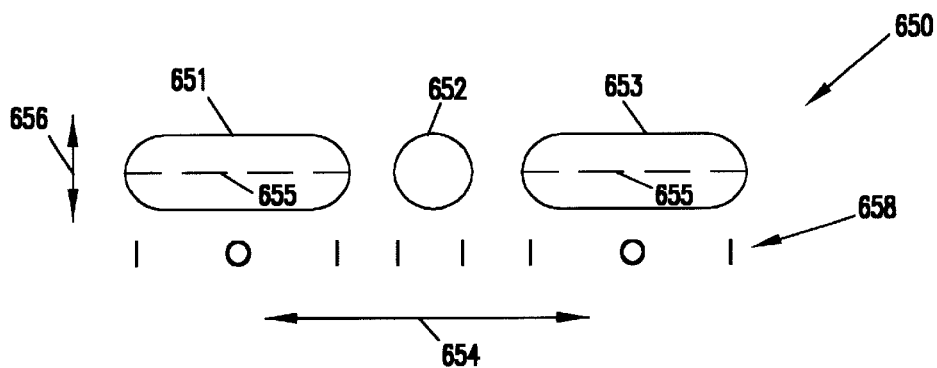
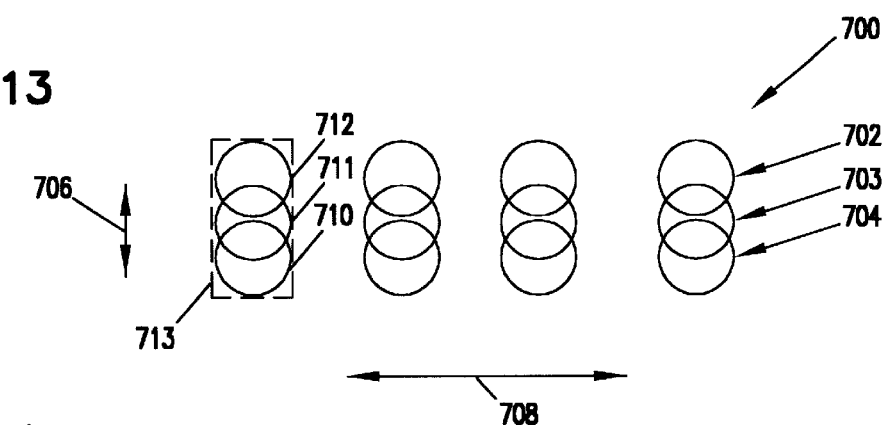
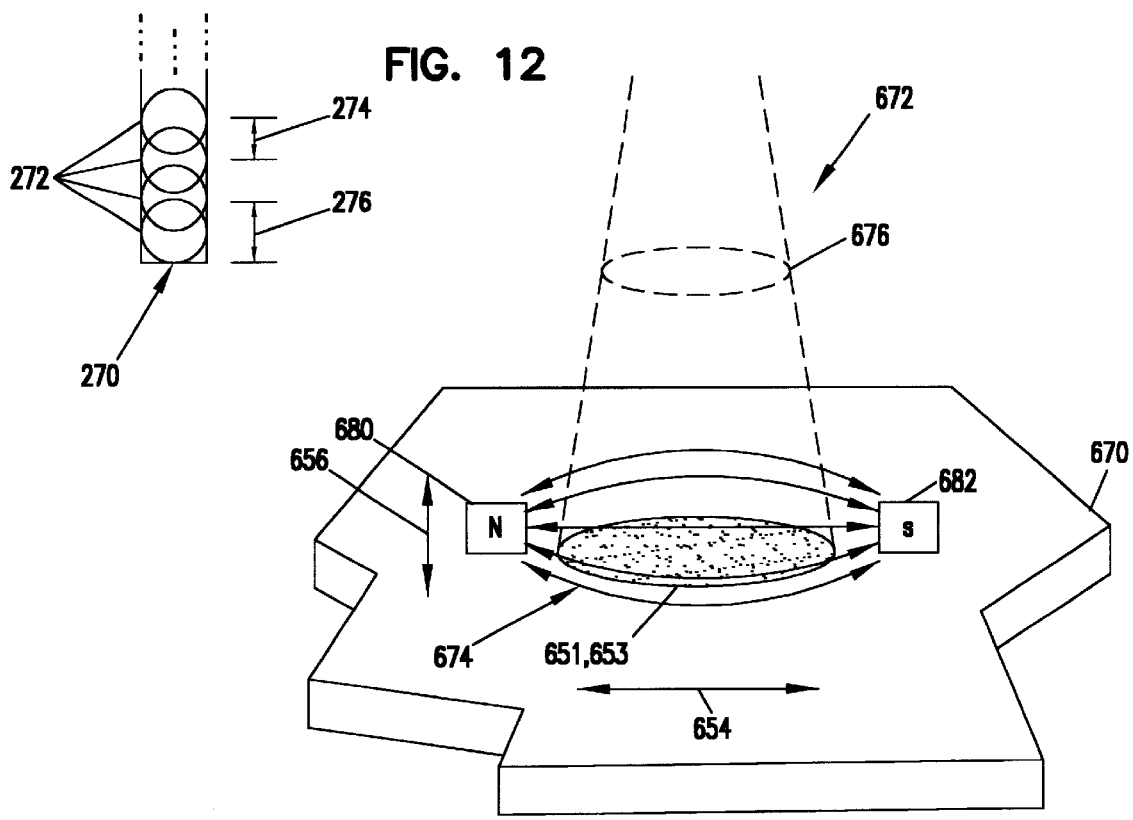

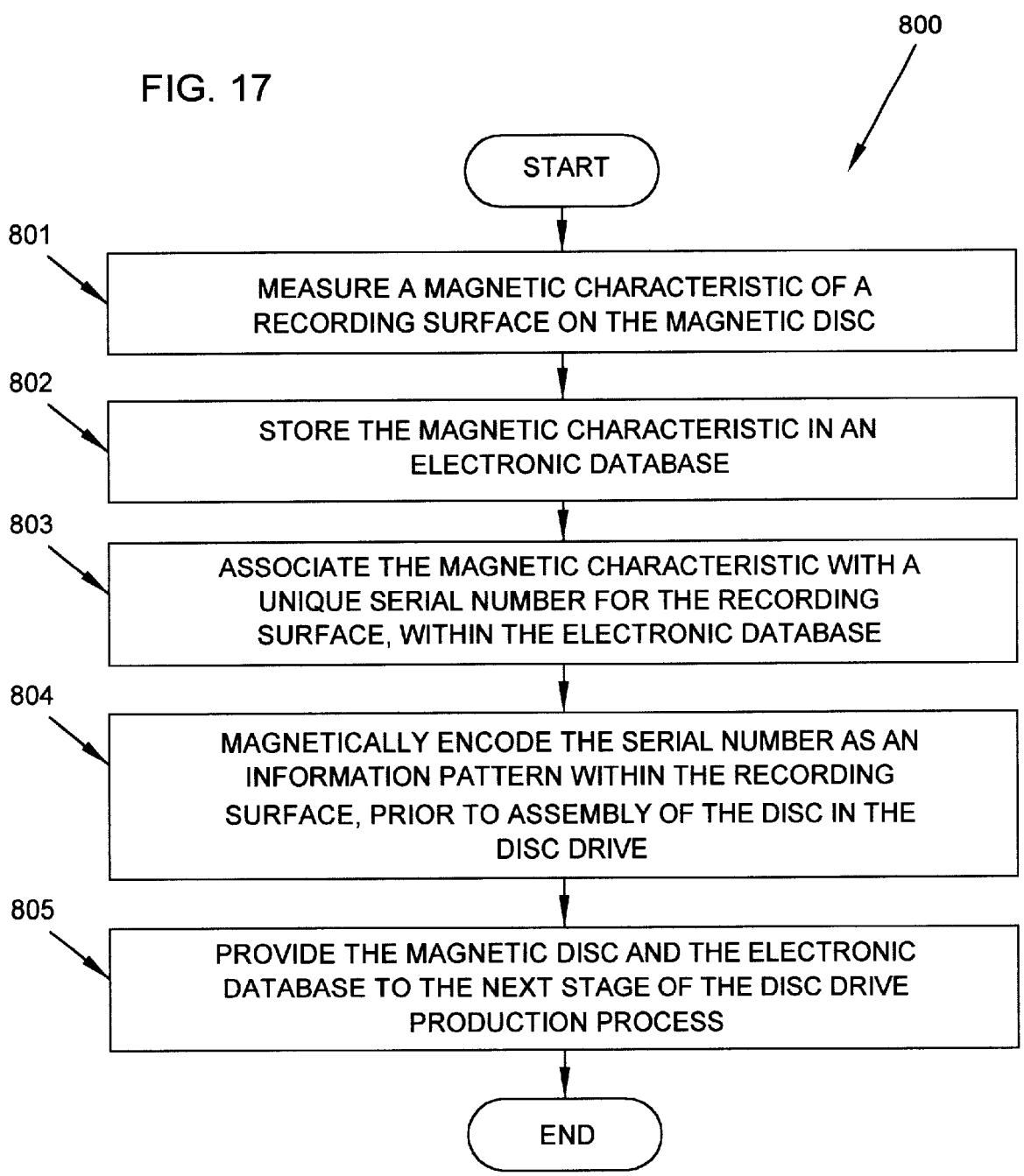

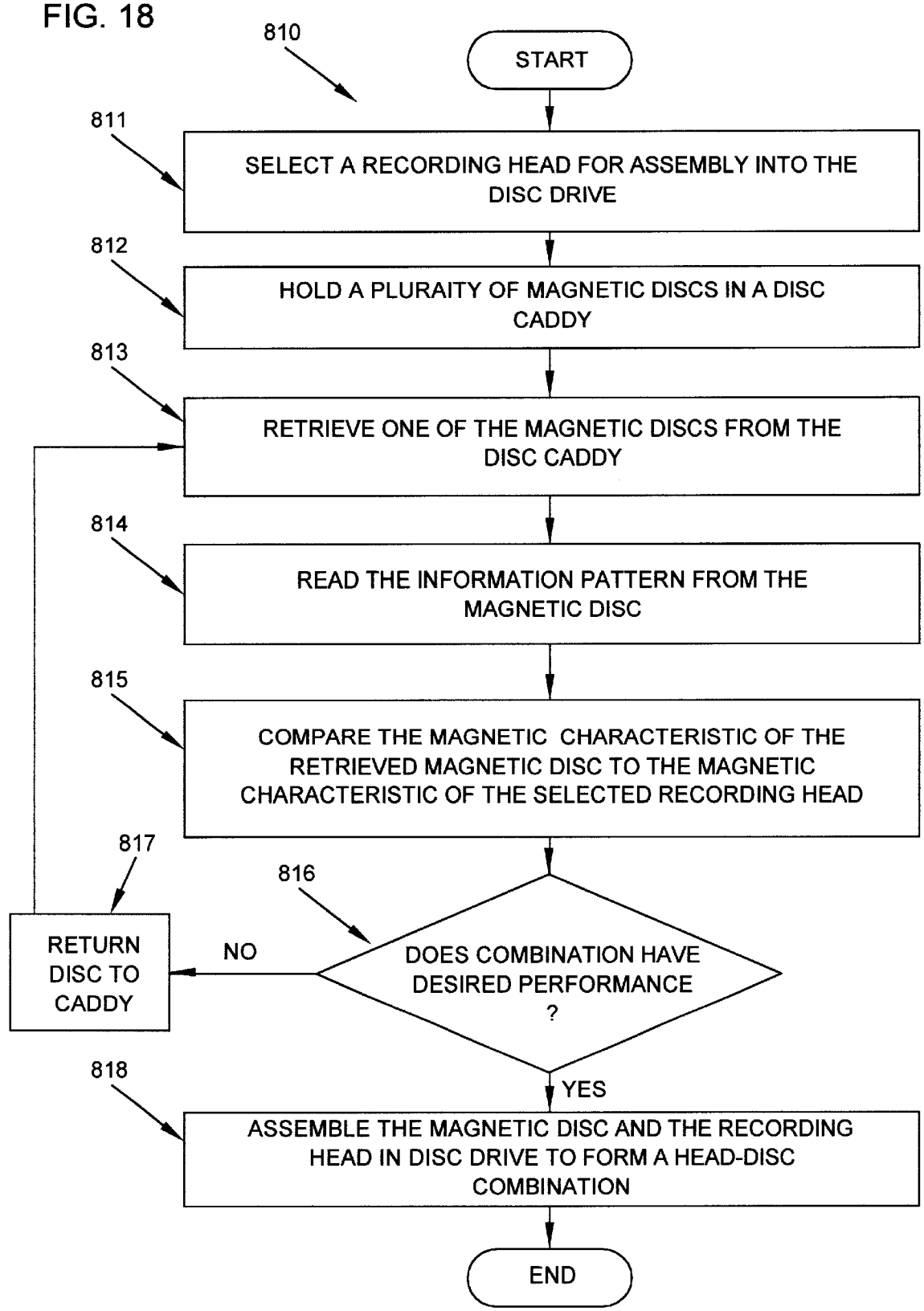

METHOD AND APPARATUS FOR ENCODING IDENTIFICATION INFORMATION ON A MAGNETIC DISC

CROSS-REFERENCE TO RELATED APPLICATIONS

This application claims the benefit of U.S. Provisional Patent Application No. 60/126,390, which is entitled "METHOD OF THERMALLY PRINTING SERVO PATTERNS ON MAGNETIC MEDIA" and was filed on Mar. 26, 1999.

Cross-reference is made to U.S. Ser. No. 09/425,768 filed on even data herewith and entitled "METHOD AND APPARATUS FOR THERMALLY WRITING SERVO PATTERNS ON MAGNETIC MEDIA, to U.S. Ser. No. 09/209,902, filed on Dec. 11, 1998 and entitled "PHOTO SERVO PATTERNING ON MAGNETO-OPTICAL MEDIA" and to U.S. Ser. No. 09/130,657, filed Aug. 7, 1998 and entitled "HARD DISC PATTERNING", which are assigned to the same Assignee.

BACKGROUND OF THE INVENTION

The present invention relates to data storage devices and, in particular, to encoding identification information and other disc parameters on a magnetic disc.

In a magnetic disc drive, data is stored on one or more discs, which are coated with a magnetic medium. The magnetic medium is typically divided into a plurality of generally parallel data tracks, which are arranged concentrically with one another perpendicular to the disc radius. The data is stored and retrieved by a transducer or "head" that is positioned over a desired track by an actuator arm. The actuator arm moves the head in a radial direction across the data tracks under control of a closed-loop servo system based on position information or "servo data", which is stored within dedicated servo fields.

During the fabrication and assembly process of a magnetic disc drive, a large number of magnetic discs and heads are fabricated and then tested to determine whether the magnetic properties of the discs and the heads fall within established parameters. If so, the discs and heads are selected for assembly into respective disc drives. Failing components are discarded. During a disc certification process, the recording surfaces on the magnetic discs are measured for magnetic coercivity, magnetic moment, and other physical and magnetic properties. The discs that have the desired properties are assembled onto spindles, which can be merged with corresponding head stack assemblies. Each spindle can include one or more individual discs, depending upon the configuration of the disc drive.

Similarly, the recording heads are tested before being mounted within a respective head stack assembly. Several structural and magnetic characteristics are measured, such as reader width, read signal amplitude, read signal pulse width at one-half amplitude, writer width, overwrite capability, cross-track symmetry, off-track capability and bit error rate, for example. Recording heads having the desired characteristics are mounted in respective head stack assemblies. These head stack assemblies are then merged with a respective disc pack and assembled into a disc drive housing. Each recording head is randomly paired with a respective recording surface in the disc pack.

Although each disc and recording head has been tested and found to have structural and magnetic characteristics within a desired range, the characteristics can vary between individual discs and heads and particular head-disc combinations can have less than optimal recording performance. For example, a particular recording surface may have a relatively high magnetic coercivity. If this disc is paired with a "weak" recording head, the resulting head-disc combination can have less than optimal overwrite capability leading to a high bit error rate. While this difficulty can be avoided by narrowing the acceptable performance ranges of each disc and head, such a solution would require higher manufacturing tolerances, reduce yield and increase manufacturing costs.

The present invention addresses these and other problems, and offers other advantages over the prior art.

SUMMARY OF THE INVENTION

One aspect of the present invention relates to a method of processing a magnetic disc prior to assembly of the disc in a disc drive storage assembly. The method includes measuring a physical characteristic of the magnetic disc and encoding an information pattern within the magnetic disc. The information pattern is associated with the measured physical characteristic.

Another aspect of the present invention relates to a method of assembling components of a magnetic disc drive. The method includes selecting a recording head for assembly into the disc drive, wherein the recording head has a magnetic characteristic. An information pattern is read from at least one of a plurality of magnetic discs prior to assembly of the disc within the disc drive. The information pattern read from the disc is associated with a magnetic characteristic of that disc. The magnetic disc is selected for assembly into the disc drive with the recording head based on a comparison of the magnetic characteristics of the magnetic disc and the recording head. The magnetic disc and the recording head are then assembled in the disc drive such that the magnetic disc and the recording head form a head-disc combination.

Yet another aspect of the present invention relates to a magnetic disc, which includes a magnetic recording surface having a physical characteristic and an information pattern encoded within the magnetic recording surface for association with the physical characteristic.

BRIEF DESCRIPTION OF THE DRAWINGS

FIG. 4 is a diagram illustrating an elongated magnetic domain formed by overlapping individual magnetic domains.

FIG. 11 illustrates a pulse train having a plurality of thermally written elliptical magnetic domains having a major axis aligned in a down-track direction.

FIG. 12 is a perspective, fragmentary view of a light beam illuminating an individual magnetic domain on a disc surface in the presence of an external magnetic field.

FIG. 13 shows a pulse train having first, second and third sets of overlapping thermally written magnetic domains.

FIG. 17 is a flow chart illustrating a disc processing method according to one embodiment of the present invention.

FIG. 18 is a flow chart illustrating a method of pairing a recording head to a recording surface, according to one embodiment of the present invention.

DETAILED DESCRIPTION OF THE PREFERRED EMBODIMENTS

Figure 1:
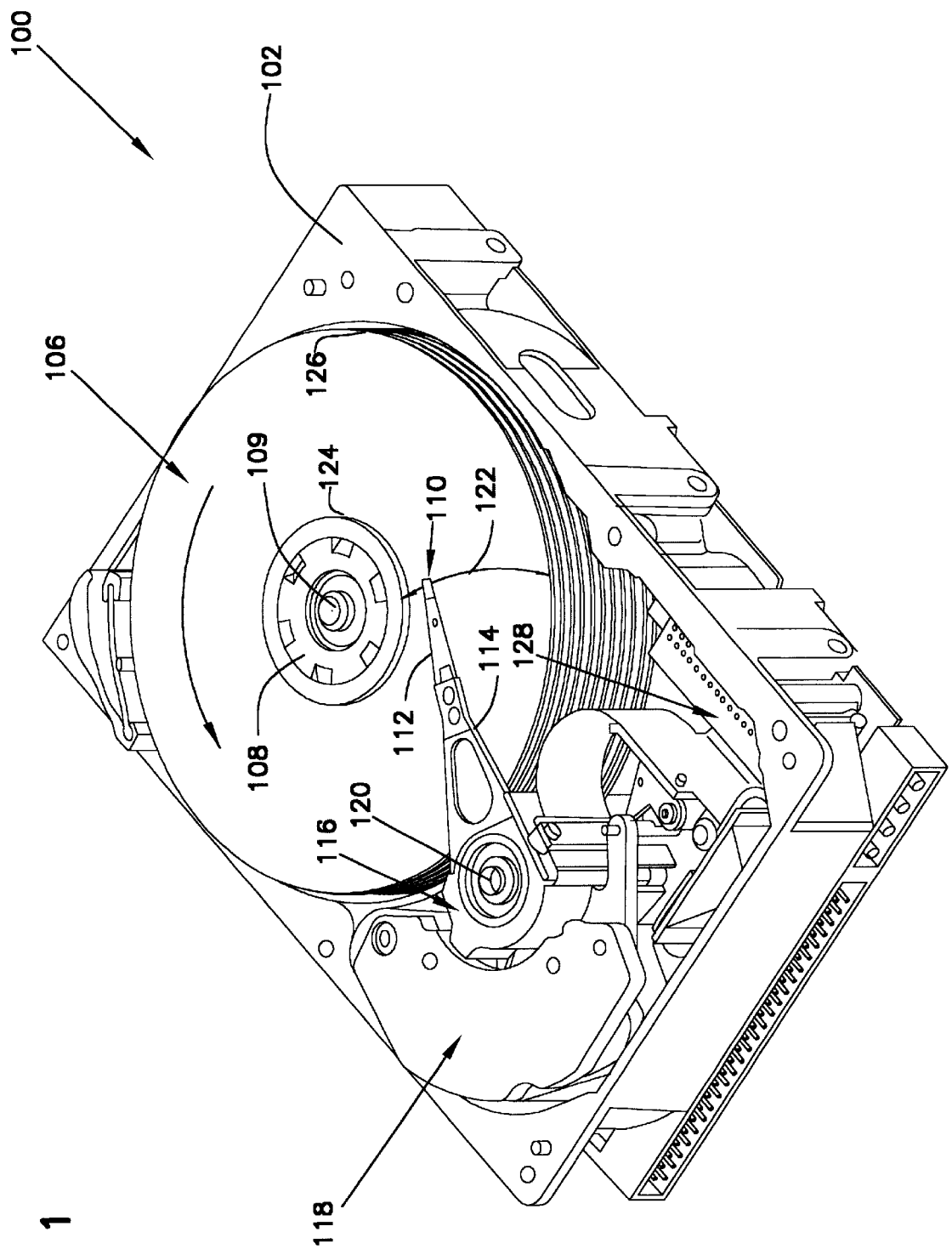
FIG. 1 is a perspective view of a head disc assembly (HDA) with which the present invention is useful.

FIG. 1 is a perspective view of a magnetic disc drive, head disc assembly (HDA) 100 with which the present invention is useful. The same reference numerals are used in the various figures to represent the same or similar elements. HDA 100 includes a housing with a base 102 and a top cover (not shown). HDA 100 further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in HDA 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the head's position so that it moves toward the desired position.

The servo field patterns are traditionally written onto the disc surface through the read/write head after the disc or discs have been assembled within HDA 100. In accordance with one embodiment of the present invention, one or more of the discs are at least partially formatted with servo patterns or other disc information prior to assembling the discs in HDA 100. The discs are formatted by thermally printing at least a portion of the servo patterns or other disc information onto the disc surfaces, one magnetic domain at a time. This information can include, for example, the location of each data storage sector, sector number identification information, the start of a group of sectors, servo pattern information and magnetic properties of the particular disc surface, for example.

Figure 2:
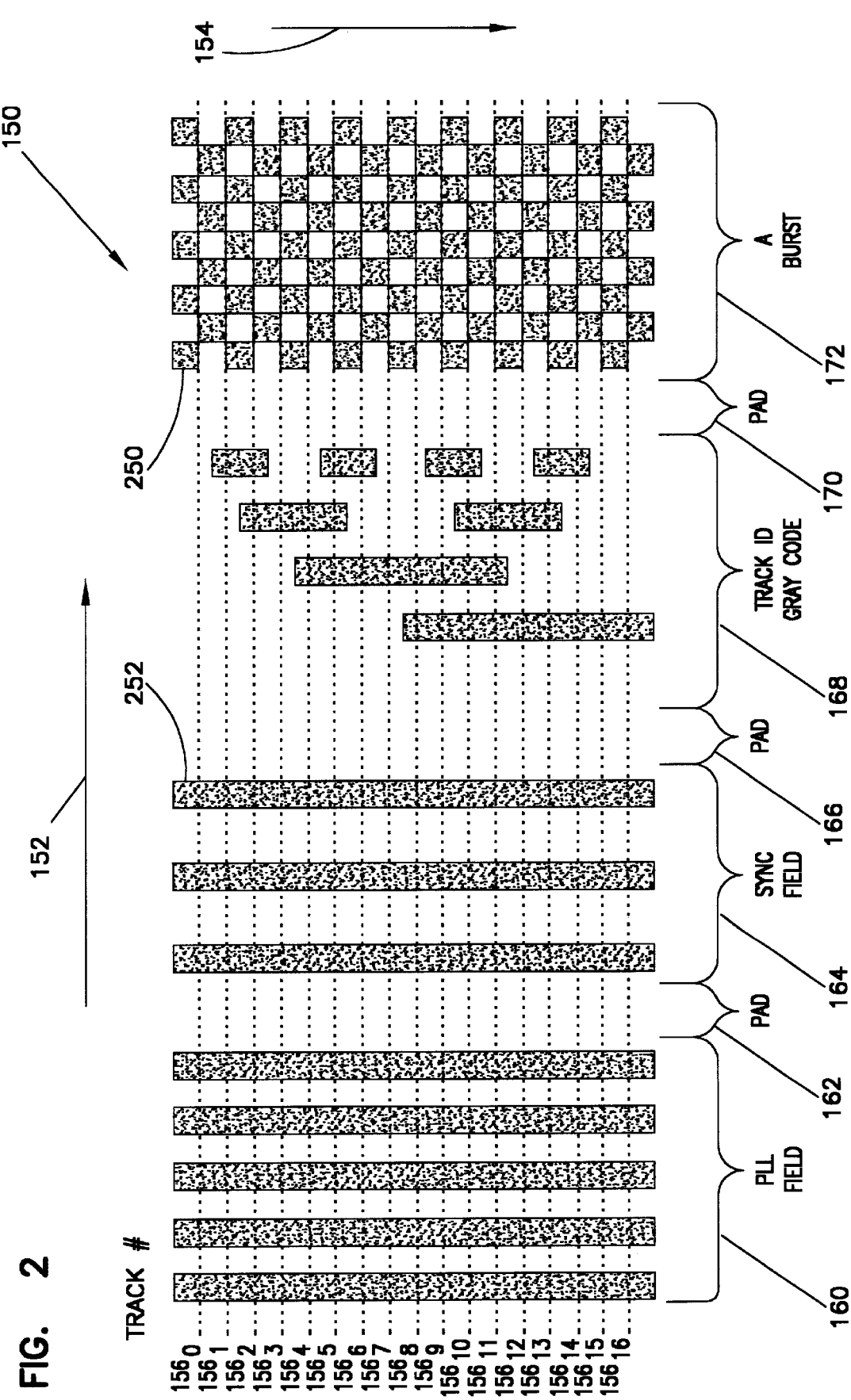
FIG. 2 is a diagram of a null-type servo magnetization pattern for a servo sector written on a disc surface in accordance with one embodiment of the present invention.

FIG. 2 is a diagram of a null-type servo magnetization pattern for a servo sector 150 written on a disc surface in accordance with one embodiment of the present invention. Arrow 152 indicates a down-track or angular dimension of the disc surface, and arrow 154 indicates a cross-track or radial dimension of the disc surface. FIG. 2 shows 17 track centers labeled $156_0$–$156_{16}$, respectively.

The shaded regions in FIG. 2 correspond to regions of opposite magnetic polarity as compared to the non-shaded regions. For example, in a longitudinal recording system, if the longitudinal magnetization in the non-shaded regions is right-to-left in figure, then the longitudinal magnetization in the shaded regions would be left-to-right. In a perpendicular recording system, the regions of opposite magnetic polarity are magnetized perpendicular to the disc surface, either into or out of the page in FIG. 2.

Servo sector 150 includes phase-locked loop (PLL) field 160, pad field 162, sync field 164, pad field 166, track ID Gray code field 168, pad field 170 and position error (PES) field 172, which is labeled "A Burst". PLL field 160 and sync field 164 contain radially coherent magnetic transitions. When the read/write head (not shown) passes over fields 160 and 164, the magnetization patterns within these fields induce an oscillating readback signal. The oscillating readback signal is used to lock the phase and frequency of the disc drive read channel to the phase and frequency of the readback signal. Track ID Gray code field 168 contains information identifying the particular track over which the head is located.

PES field 172 is used to identify the location of the head with respect to the track center line. In the embodiment shown in FIG. 2, PES field 172 contains a null-type magnetization pattern. The null-type magnetization pattern is written in a predetermined phase relation to the magnetization patterns in fields 160 and 164. As the read/write passes over PES field 172, the readback signal generated in the head is demodulated and integrated to produce a position error value. At the track center, the position error value will have zero magnitude. If the head is positioned to one side of the track center, the position error value will be positive and have a magnitude indicating the amount of displacement. If the head is displaced to the other side of the track center, the position error value will be negative and have a magnitude indicating the amount of displacement. Other types of servo patterns can also be used, such as a split burst servo pattern. Demodulation of servo patterns is discussed in more detail in U.S. patent application Ser. No. 09/268,584, filed Mar. 15, 1999 and entitled "ASYNCHRONOUS DIGITAL DEMODULATOR AND METHOD FOR A NULL-TYPE SERVO PATTERN," for example.

The smallest unit of the servo pattern is one of the small squares in PES field 172. When the head passes over a region bounded by areas of opposite magnetic polarity, a di-bit results in the readback signal. This di-bit (or cycle) is a building block of all the patterns within servo sector 150, and it consists of defined magnetic domains.

Traditionally, servo patterns are written one "servo track" at a time. The definition of a "servo track" depends on the product. As discussed above, di-bits have traditionally been written onto the disc surface by the write transducer in the read/write head. By writing these di-bits coherently track-to-track, magnetic domains of opposite polarity are written on to the disc. These magnetic domains are roughly rectangular. In one embodiment of the present invention, at least a portion of the individual magnetic domains in servo sector 150 are thermally printed onto the disc surface, one magnetic domain at a time before the disc is assembled in the drive.

Figure 3:
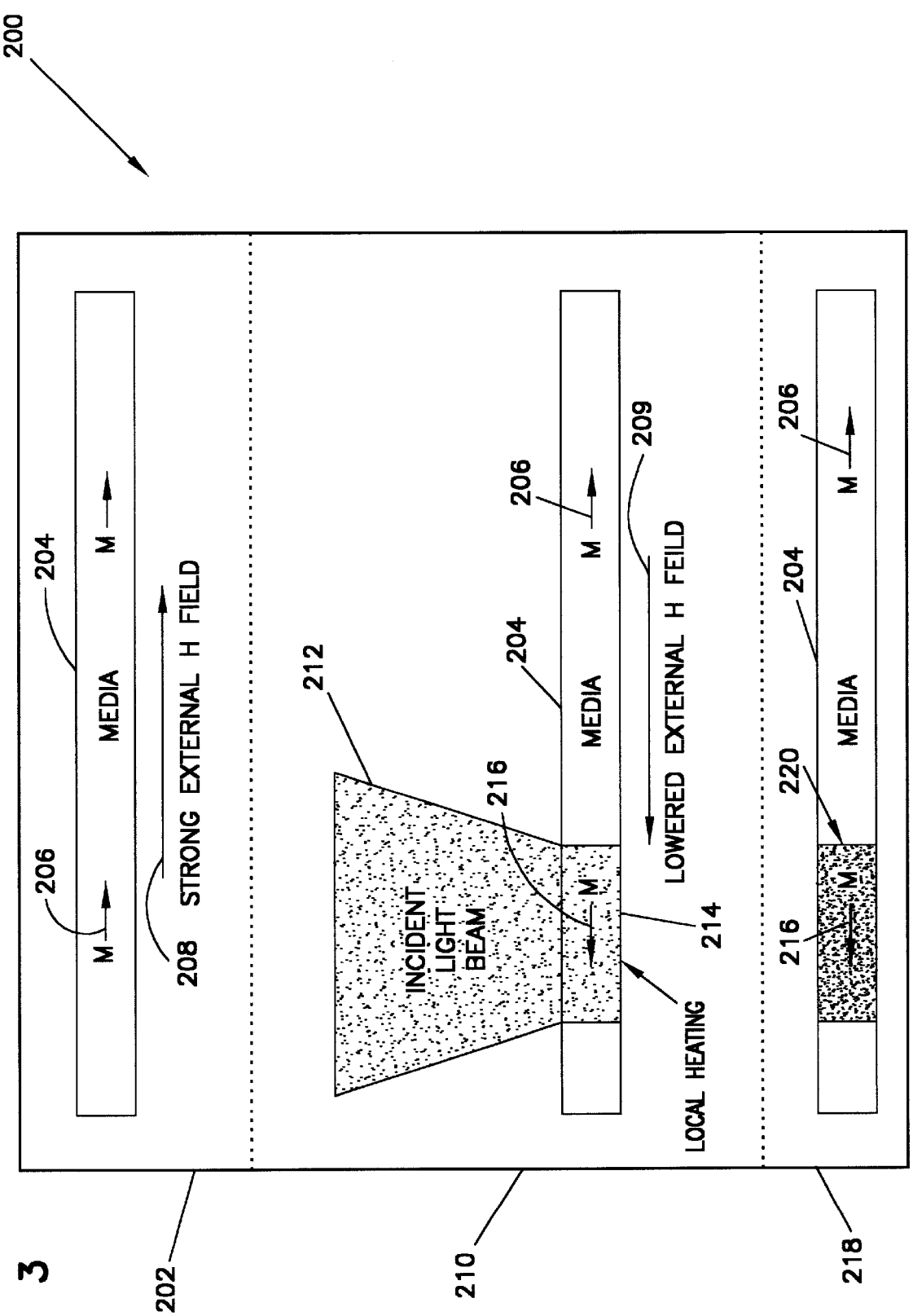
FIG. 3 is a diagram illustrating a thermal printing process according to one embodiment of the present invention.

FIG. 3 is a diagram illustrating a thermal printing process 200 according to one embodiment of the present invention. At step 202, magnetic media 204 is magnetized in a uniform magnetization direction 206 with a strong external magnetic (H) field 208. For example, in a longitudinal recording system, the entire disc is circumferentially "DC" magnetized in a uniform longitudinal direction. External magnetic field 208 has a level that is greater than the magnetic coercivity of magnetic media 204 at an ambient temperature.

At step 210, external magnetic field 208 is changed to external magnetic field 209, which has a reduced field strength and an opposite polarity as compared to field 208 in step 202. External magnetic field 209 has a field strength that is that is less than the magnetic coercivity of magnetic media 204 at the ambient temperature. An incident light beam 212 is directed to a selected area 214 on media 204 to produce local heating of media 204 within area 214. The temperature of media 204 in area 214 is elevated from the ambient temperature to an elevated temperature. The magnetic coercivity (Hc) of media 204 decreases with increasing temperature. When the coercivity drops below the level of externally applied magnetic field 209, the magnetization 216 in the heated area 214 will align itself with the applied field.

At step 218, light beam 212 is removed from area 214, without changing external magnetic field 209. When area 214 returns to room temperature, a thermally written magnetic domain 220 defined by the boundaries of area 214 will remain. The shape of magnetic domain 220 is determined by the shape of the illumination pattern on media 204.

Light beam 212 is then moved to another area on medium 204 to thermally write another magnetic domain. Steps 210 and 218 can be repeated as many times as necessary to produce magnetically reversed domains at different locations on medium 204 by moving the location of light beam 212. For example, steps 210 and 218 can be repeated one or more times for each of the shaded regions in PES field 172 shown in FIG. 2. In one embodiment, the light beam is pulsed on for a selected period of time at least once for each of the magnetic domains, in the presence of eternal magnetic field 209. Each of the magnetic domains are spatially separated from one another on the media by moving the relative positions of light beam 212 and the disc surface in the radial and circumferential directions. Information can be magnetically encoded on the disc surface in the circumferential direction, the radial direction or both.

The length of time magnetic domain 204 is exposed to the illumination pattern depends on the type of light source used and the amount of local heating required. Several types of light sources can be used. The chosen light source will depend on various factors such as the resolution desired and the need to avoid unintended changes in disc coating properties. In general, light sources having a shorter wavelength will provide better resolution. However, as the chosen wavelength becomes shorter, unintended damage to disc coatings may result. For example, while a mercury light source may provide desired resolution properties, it can increase risk of damage to the corrosion resistant carbon layer that may be applied to a disc surface. In such a case, a lower energy light source, such as a green Argon laser, may be more appropriate. In one embodiment, the light beam is incoherent. The temperature to which each magnetic domain is heated is regulated by the type of light source used, the duration of the media exposure and the power output of the light source.

The elongated shaded regions in PLL field 160, sync field 164 and track ID Gray code field 168 in FIG. 2 can be formed by scanning the light beam and the resulting illumination pattern in the radial, off-track direction 154. If the media is continuously exposed to the light beam during a radial scan, the media will cool in a heat gradient along the length of the thermally written magnetic domain. Alternatively, the light beam can be pulsed or modulated as the light beam is scanned radially across the media surface. The spacing between adjacent illumination patterns is set so that the patterns at least partially overlap one another to create an elongated line of overlapping magnetic domains. For example, FIG. 4 shows an elongated magnetic domain 270 formed by overlapping individual magnetic domains 272 or by overlapping adjacent illumination patterns during a radial scan.

Figure 5:
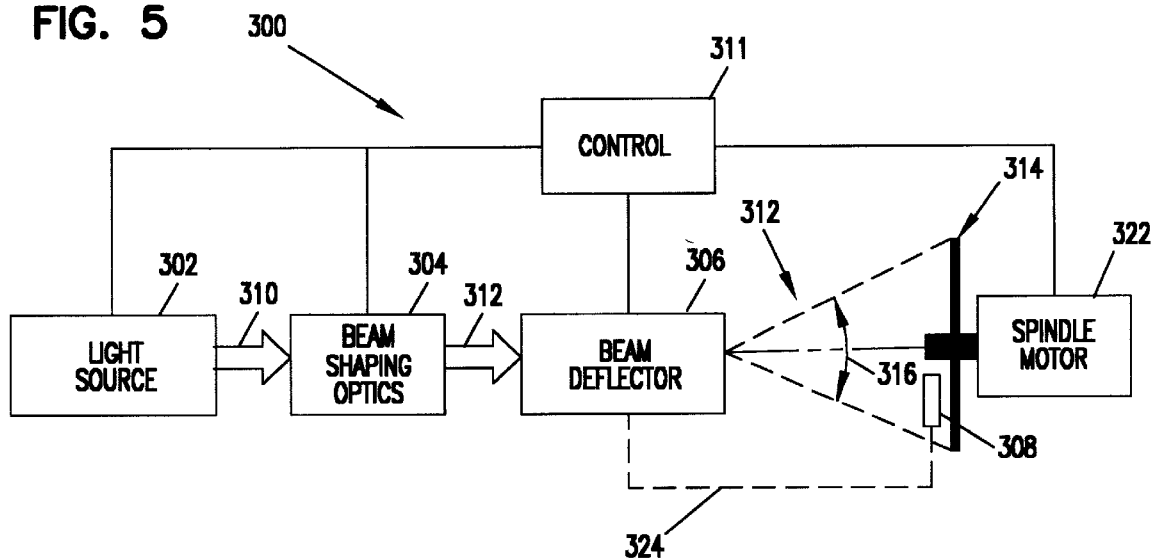
FIG. 5 is a schematic diagram of a system for thermally printing servo patterns on magnetic media, according to one embodiment of the present invention.

FIG. 5 is a schematic diagram of a system for thermally printing servo patterns on magnetic media, according to one embodiment of the present invention. System 300 includes light source 302, beam shaping optics 304, beam deflector 306, external magnetic field source 308 and control circuitry 311. Light source 302 generates light energy 310, which is passed through beam shaping optics 304 to beam deflector 306. Beam shaping optics 304 generates a light beam 312 having a desired illumination pattern shape, which at least partially defines the shape of the magnetic field transition surrounding each thermally written magnetic domain.

Beam deflector 306 deflects beam 312 to a desired location on disc 314, within beam range 316. Beam deflector 306 can be configured to deflect light bean 312 in a radial direction across the surface of disc 314 or in an angular, circumferential direction along a desired data track on the disc, if desired. In one embodiment, beam deflector 306 includes a mirror mounted on a voice coil motor which is controlled by control circuitry 311. In another embodiment, beam deflector 306 includes an electrostatic mirror system. Other types of beam deflectors can also be used for deflecting light beam 312.

Control circuitry 311 is coupled to light source 302, beam shaping optics 304, beam deflector 306 and spindle motor 322 for controlling various aspects of their operation. Control circuitry can be configured to control the operating parameters of light source 302, such as the exposure time and intensity. Control circuitry 311 can also be coupled to beam shaping optics 304 for controlling the shape of the light beam. For example, control circuitry 311 can change the illumination pattern shape from one write operation to the next, if desired, for effecting the relative distances between adjacent transitions in magnetic polarity on the disc surface. This can be used to implement a desired data coding scheme or to simply change the size or shape of a particular magnetic domain area.

Control circuitry 311 can also be coupled to a spindle motor 322 for rotating disc 314 during servo writing operations. Disc 314 can be rotated in a continuous fashion while being exposed to light beam 312 (either continuous exposure or pulsed exposure) or can be rotated in discrete steps between individual write operations. In the later example, disc 314 would be stationary as each magnetic domain is written.

External magnetic field source 308 can include an electromagnet or a permanent magnet, for example, which provides a magnetic field having a desired field strength at a desired orientation. The magnetic field can be limited to the area being written or can extend over all or substantially all of the disc surface. In one embodiment, the magnetic field is limited to the area being written, and magnetic field source 308 is moved with the illumination pattern under the control of beam deflector 306, as shown by dashed line 324. For perpendicular recording, magnetic field source 308 can include an electromagnetic coil having a coil axis that is perpendicular to the surface of disc 314, for example. Light beam 312 is passed through the center of the coil. For longitudinal recording, magnetic field source 308 can include one or more permanent magnets having a gap between north and south poles, which is arranged parallel to the disc surface, through the illumination pattern. Alternatively, two spaced, parallel electromagnetic coils can be arranged with a common axis oriented parallel to the disc surface. Other movable or stationary magnetic structures and configurations can also be used.

Figure 6:
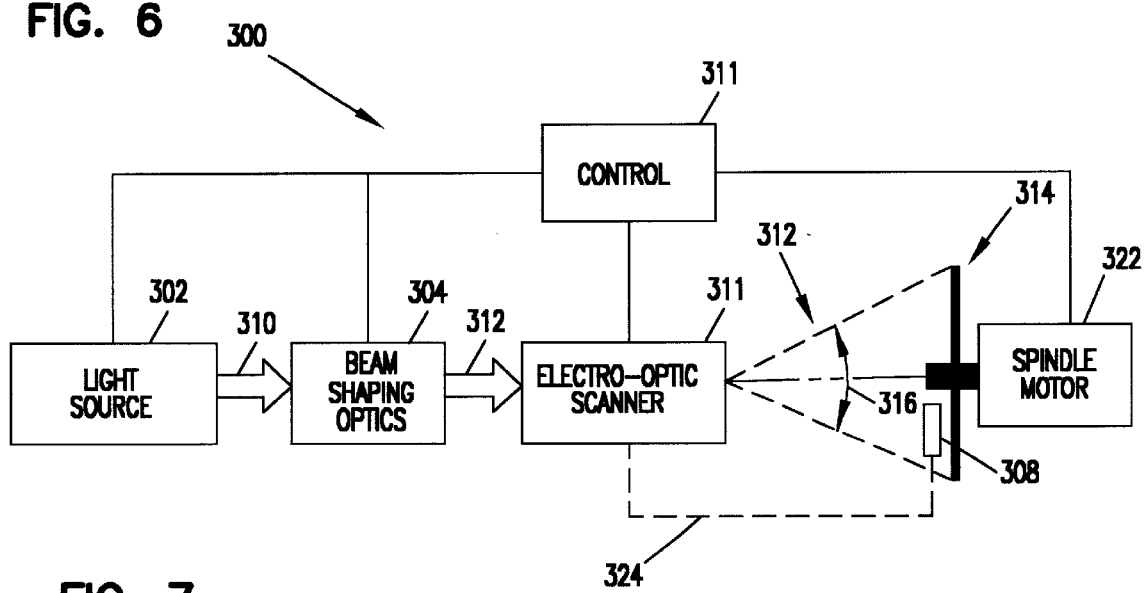
FIG. 6 is a schematic diagram of a system for thermally printing servo patterns on magnetic media, according to another embodiment of the present invention.

FIG. 6 is a schematic diagram of a system for thermally printing servo patterns on a disc surface according to an alternative embodiment of the present invention. The same reference numerals are used in FIG. 6 as were used in FIG. 5 for the same or similar elements. In FIG. 6, beam deflector 306 is replaced with an electro-optic scanner 340 for scanning light beam 312 to the correct location on the surface of disc 310. For example, electro-optic scanner 340 can include an electro-optic scanner developed by the Data Storage Systems Center at Carnagie Mellon University. Currently, electro-optic scanners are limited to deflections on the order of one degree in one dimension. Improvements in electro-optic scanner technology may enhance this deflection. As discussed above, control circuitry 311 may also rotate disc 314 to facilitate the use of a one-dimensional electro-optic scanner. An electro-optic scanner provides an advantage of a precise placement of the illumination pattern on the surface of disc 314.

Figure 7:
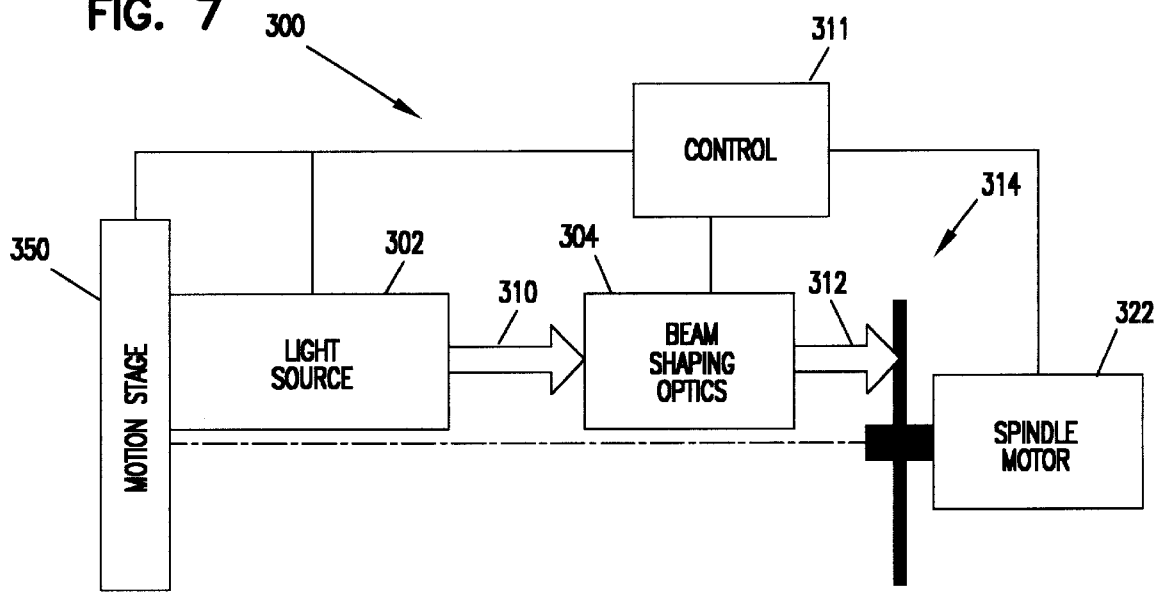
FIG. 7 is a schematic diagram of a system for thermally printing servo patterns on magnetic media, according to yet another embodiment of the present invention.

FIG. 7 is a schematic diagram of a system for thermally printing servo patterns on magnetic media according to another alternative embodiment of the present invention. The same reference numerals are used in FIG. 7 as were used in FIGS. 5 and 6 for the same or similar elements. In FIG. 7, motion stage 350 mechanically translates light source 302 and beam shaping optics 304 radially across the surface of disc 314, while spindle motor 322 rotates disc 314 to any selected circumferential location. Alternatively, motion stage 350 can be used to move spindle motor 322 and disc 314, leaving light source 302 and optics 304 stationary.

Figure 8:
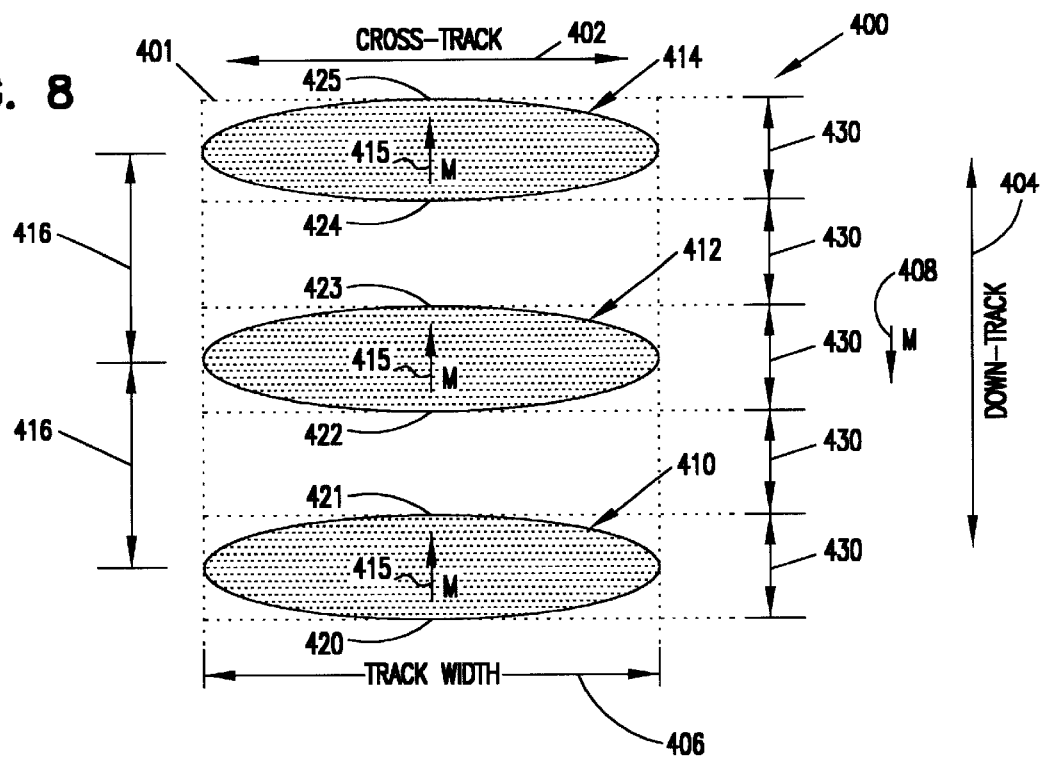
FIG. 8 is a diagram illustrating a single frequency di-bit pulse train written along a track on the disc surface in accordance with one embodiment of the present invention.

FIG. 8 is a diagram illustrating a single frequency di-bit pulse train 400 written along a track 401 on the disc surface in accordance with one embodiment of the present invention. Arrow 402 indicates a radial or cross-track direction, and arrow 404 represents a circumferential or down-track direction. Arrow 406 indicates the track width. Prior to writing pulse train 400, the disc surface was conditioned with a circumferentially uniform magnetization field such that track 401 has a background magnetization (M) in a direction indicated by arrow 408.

Pulse train 400 includes magnetic domains 410, 412 and 414, which are thermally written one domain at a time by directing an illumination pattern toward each location and heating the location in the presence of an external magnetic field having a polarity 415, which is opposite to the background magnetization direction 408. The shape of the illumination pattern determines the shape of each magnetic domain 410, 412 and 414, and in particular, the shape and position of transitions in magnetic polarity at the boundaries of each domain. In FIG. 8, the light beam used to form magnetic domains 410, 412 and 414 was elliptical.

In this example, magnetic domains 410, 412 and 414 are spaced from one another by a uniform distance or "di-bit cell spacing" 416. This distance is measured from the center of one of the magnetic domains to the center of the next subsequent magnetic domain in the pulse train, along down-track direction 404. This distance is determined by the spacing between each illumination pattern. The spacing between subsequent transitions in magnetic polarity along down-track direction 404 is measured between transition edges 420–425 and is indicated by arrows 430. Each transition generates a pulse in the readback signal.

The di-bit cell spacing 416 is equal to twice the transition-to-transition spacing 430, which creates a single frequency di-bit pulse train. This type of spacing can be used for creating the position error signal (PES) burst fields in a servo pattern, such as field 172 of FIG. 2, as well as the phase locked loop (PLL) and sync fields, such as fields 160 and 162 shown in FIG. 2. This type of spacing can also be used for creating other fields within the servo pattern.

Figure 9:
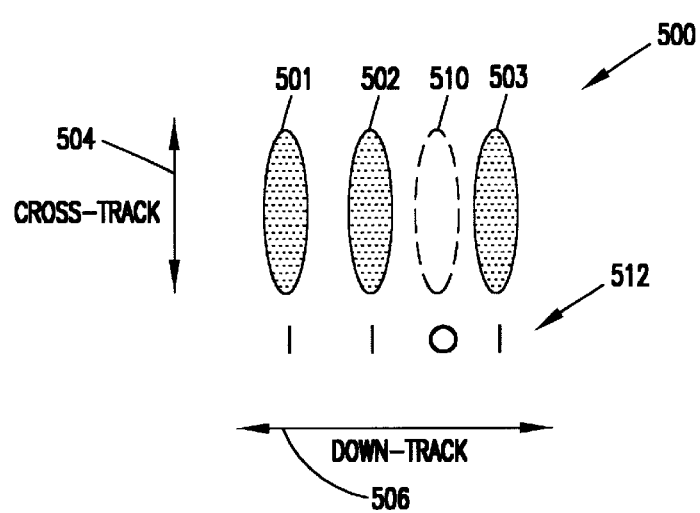
FIG. 9 is a diagram illustrating a pulse train in which illumination pattern spacing is varied within the train.

The illumination pattern size and shape and the pattern spacing can also be controlled or varied while formatting the disc to encode information onto the disc surface, such as the information in track ID field 168 in FIG. 2. Other disc information can also be encoded onto the disc surface. FIG. 9 is a diagram illustrating a pulse train 500 in which the illumination pattern spacing is varied. Pulse train 500 includes a plurality of magnetic domains 501–503, which are thermally written on to the magnetic disc by using an illumination pattern for heating each magnetic domain within the presence of an externally applied magnetic field. Arrow 504 indicates a cross-track direction, and arrow 506 indicates a down-track direction. Again, the shaded regions correspond to regions of opposite magnetic polarity as compared to the non-shaded regions.

In FIG. 9, the distances between transitions in magnetic polarity is varied by selectively varying the spacing between magnetic domains 501–503 in down-track direction 506. This spacing is controlled by controlling the spacing between each illumination pattern. The pattern spacing can be used to encode information onto the disc surface. For example, the presence of a magnetic domain in a particular bit location can represent a logical "1" or "0", depending upon the convention used, and the absence of a magnetic domain in a particular bit position can represent a logical "0" or "1", respectively. The presence or absence of a magnetic domain is detected by the read/write head by detecting the presence or absence of two transitions (the left and right transitions of a particular magnetic domain in down-track direction 506) in a particular bit position. The locations of both of these transitions is solely defined by the illumination pattern shape. In FIG. 9, dashed line 510 represents the absence of a magnetic domain in the bit position between domains 502 and 503. Pulse train 500 can therefore represent an encoded binary value of "1101", as indicated by arrow 512.

Figure 10:
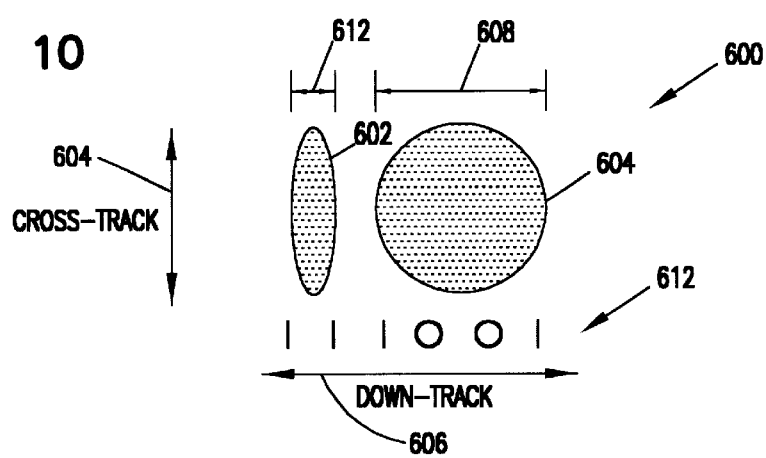
FIG. 10 is a diagram illustrating a pulse train in which the illumination pattern shape is varied within the train.

FIG. 10 is a diagram illustrating a pulse train 600 according to another embodiment of the present invention in which the illumination pattern shape is varied within the pulse train. Arrow 604 indicates a cross-track direction, and arrow 606 indicates a down-track direction. Pulse train 600 includes a plurality of magnetic domains 602–603, which are shaded to indicate that the magnetic domains have a magnetic polarity which is opposite to that of the non-shaded regions in FIG. 10. Beam shaping optics are used to vary the shape of the illumination patterns and thus the shape of the individual magnetic domains on a bit-by-bit basis. This allows the distance between transitions to be varied with the illumination pattern shape. For example, transition-to-transition spacing 608 is significantly larger than transition-totransition spacing 610. Thus, the illumination pattern shape can be used to encode information onto the disc surface. If a logical "1" or "0" were represented by the presence or absence of a single transition at predetermined circumferential intervals, then elongating the shape of a particular magnetic domain has the effect of delaying the trailing transition of that domain in time past a particular temporal bit position. For example, in FIG. 10, if each transition represents a logical "1", then pulse train 600 represents an encoded binary "111001", as indicated by arrow 612. In the example shown in FIG. 10, encoding information by changing the illumination pattern shape significantly increases the code rate since data is represented by a single transition rather than two transitions. Increasing the code rate increases the density and speed at which information can be stored on the disc surface. The illumination pattern shape can also be controlled to avoid undesirable pulse train frequencies or bit patterns that are known to cause read errors, similar to maximum transition run (MTR) length-limited type codes.

FIG. 11 illustrates an example of a pulse train 650 having a plurality of thermally written elliptical magnetic domains 651 and 653, which have a major axis 655 aligned parallel to down-track axis 654, as opposed to cross-track axis 656 (as in FIG. 10). Magnetic domain 652 is circular. Information is encoded onto the disc surface by elongating domains 651 and 653 with respect to domain 652 by changing the illumination pattern shape from circular to elliptical. For example, pulse train 650 can represent an encoded binary "10111101", as labeled by arrow 658 beneath each magnetic transition or lack of transition along down-track axis 654.

FIG. 12 is a perspective, fragmentary view of a magnetic disc 670, which shows the formation of one of the elongated magnetic domains 651, 653 of FIG. 11. A light beam 672 is directed to the surface of disc 670 in the presence of an external magnetic field 674. In the example shown in FIG. 12, light beam 672 has an elliptical, cross-sectional shape 676 with a major axis oriented parallel to down-track direction 654. Light beam 672 therefore forms an elliptical illumination pattern 678 on the surface of disc 670, which defines the elliptical boundary shape of magnetic domain 651, 653. Beam shaping optics, such as that shown in FIGS. 5–7, can be used to form the desired illumination pattern shape. This shape can be selectively varied from at least one magnetic domain to the next along the surface of disc 672 to encode information onto the disc surface, under the control of control circuit 311 (shown in FIGS. 5–7). Magnets 680 and 682 generate magnetic field 674 adjacent the surface of magnetic disc 670, through magnetic domain 651, 653.

Thermally writing individual magnetic domains in a servo pattern through a light source and beam shaping optics is more versatile than conventional servo writing in that the shape of each magnetic domain is primarily constrained by the beam shaping optics rather than the write pole geometry of the produce head. The longer radial magnetic domains shown in FIG. 2 in PLL field 160, sync field 164 and track ID field 168 can be formed by radially overlapping individual elliptical magnetic domains or by scanning the illumination pattern in a radial direction.

Also, by overlapping at least two thermally written domains during two different writing operations, the effects of the curved transitions at the radial edges of each magnetic domain can be mitigated. For example, FIG. 13 shows a pulse train 700 having first, second and third sets 702–704 of thermally written magnetic domains 710–712, which are formed during individual writing operations and overlap one another in radial, cross-track direction 706. The combined area 713 of domains 710–712 is substantially rectangular. The resulting servo pattern formed by pulse train 700 is more regular and resembles current rectangularly shaped servo pattern designs more closely.

In an alternative embodiment, additional writing operations can be used to overlap additional magnetic domains (not shown) in down-rack direction 708. In another alternative embodiment, Fourier-type beam shaping optics can be used to generate a rectangular-shaped illumination pattern for use in the servo pattern. An example of a rectangular illumination pattern shape is shown at 214 in FIG. 3. Thus, the rectangular-shaped magnetic domains shown in FIG. 13 can each be generated with a single rectangular-shaped illumination pattern or a plurality of overlapping rectangular-shaped illumination patterns.

In some applications, it may be too time consuming to format an entire disc surface with servo patterns and other formatting information, one magnetic domain at a time. In these applications, the thermal servo track writing process of the present invention can be used to write a portion of this information onto the disc surface prior to assembling the disc within the head disc assembly. The thermally written formatting information can then be used during subsequent assembly operations or servo track writing processes through the product read/write head. For example, the thermal servo track writing process of the present invention can be used to write a radial ruler on the disc surface that can be used later by the read/write head to verify radial position during subsequent servo writing operations.

In one embodiment of the present invention, thermal printing can be used during the disc certification process to magnetically encode information patterns onto the disc prior to assembly of the disc in a disc drive. The information patterns can include a serial number for the recording surface and/or disc certification data such as a measure of the disc's magnetic coercivity, magnetic moment and other physical and magnetic properties. For example, the information can identify physical regions on the disc having more mass than other regions, which can be used in later assembly steps to balance the disc and avoid wobble. The magnetic property information can be used further downstream in the production process to match the magnetic properties of the disc to the magnetic properties of the head with which the disc is paired. Each head and disc surface pair can therefore be optimized on an individual basis.

Figure 14:
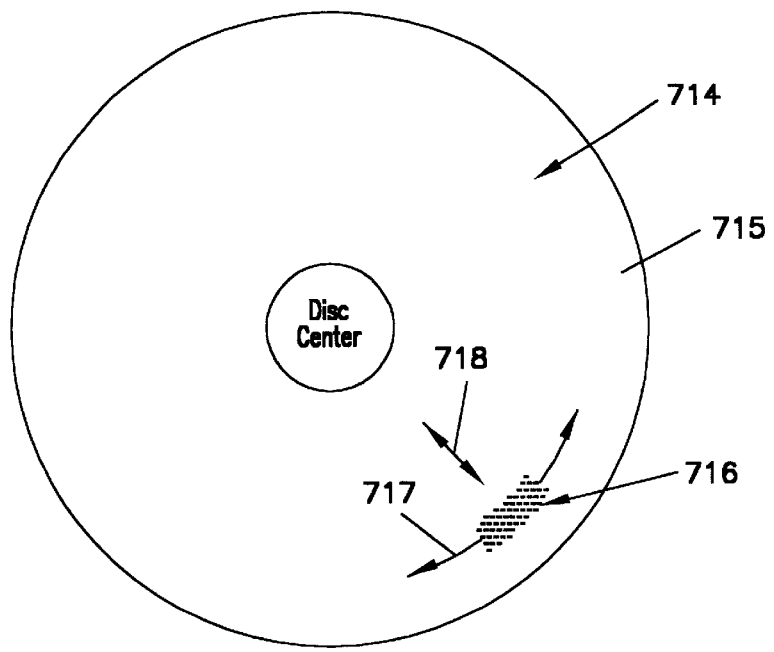
FIG. 14 is a top plan view of a magnetic disc having an information pattern magnetically encoded on the disc surface.

FIG. 14 is a top plan view of a magnetic disc 714 having a recording surface 715 with an information pattern magnetically encoded within an area 716. The information pattern can be magnetically encoded in a circumferential direction 717, a radial direction 718 or in both directions 717 and 718 to form a two-dimensional array. Several methods of writing the information can be used, such as the thermal printing process discussed above with reference to FIGS. 3–13. Alternatively, the information pattern can be written on the surface by reactive ion etching, ion milling, electromachining, or laser ablation, for example.

Figure 15:
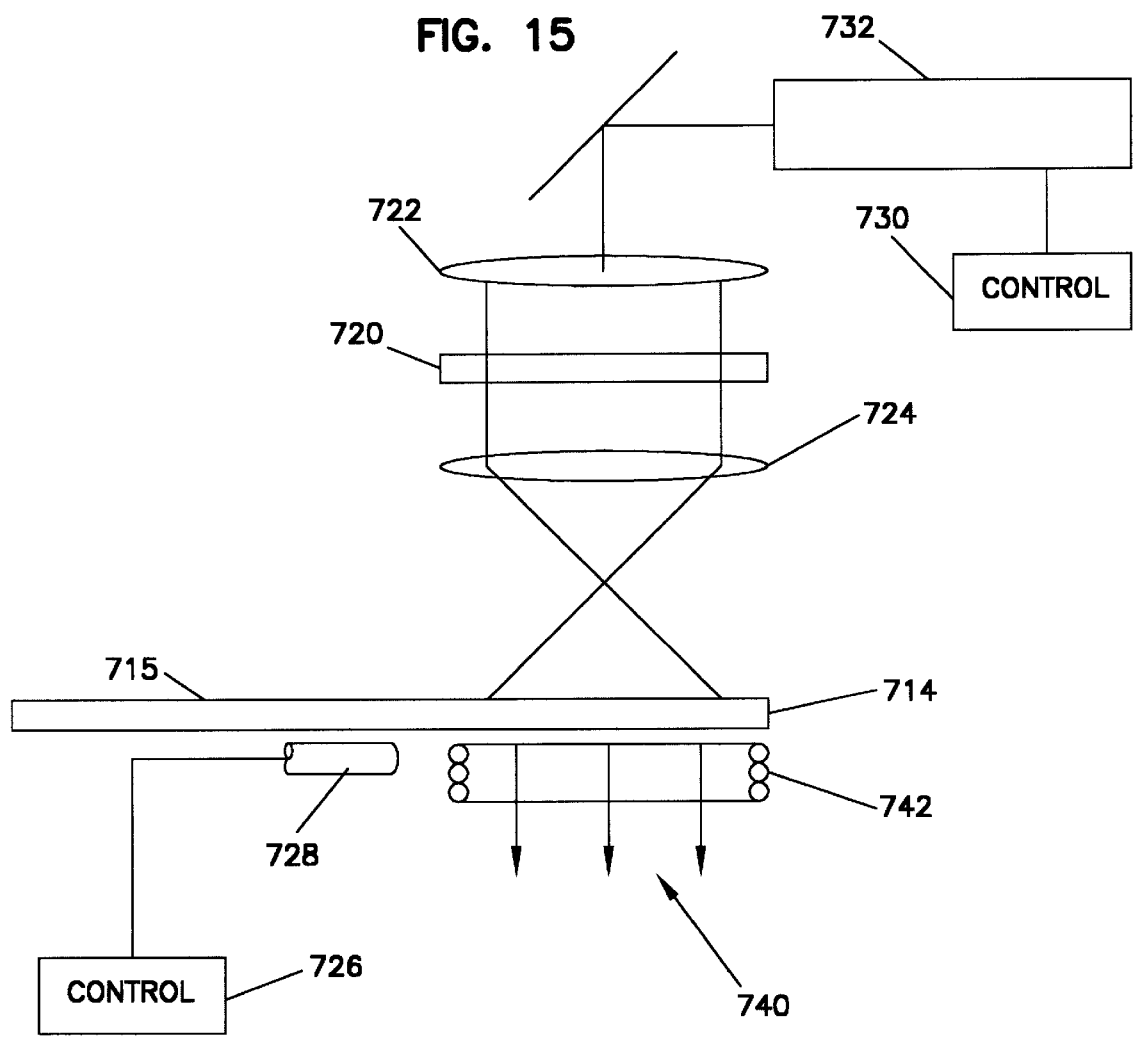
FIG. 15 is a diagram illustrating an apparatus for thermally printing an information pattern onto a disc surface according to an alternative embodiment of the present invention.

FIG. 15 is a diagram illustrating an apparatus for thermally printing the information pattern onto disc surface 715 according to an alternative embodiment of the present invention. A mask 720 bearing the information pattern is shown supported between two lenses 722 and 724. To transfer the information pattern from mask 720 to recording surface 715, control system 726 drives motor drive 728 to align mask 720 and disc 714 so that the information pattern is projected onto the appropriate area of recording surface 715. Light control system 730 activates light source 732 to optically project light through lens 722, mask 720 and lens 724 to image the information pattern on mask 720 onto recording surface 715. Lens 722 homogenizes the light distribution over mask 720. The light energy passing through mask 720 and projected onto recording surface 715 will cause the illuminated, exposed area of recording surface 715 to rise from an ambient temperature to an elevated temperature above its compensation temperature where information is stored on the disc. The temperature is regulated by the type of light source used, the duration of media exposure and the power output of light source 732 as controlled by light control system 730. An electromagnetic coil 742 applies a magnetic field 740 (for perpendicular recording, for example) to recording surface 715 while the exposed area on recording surface 715 is raised to the elevated temperature for selectively reversing magnetic domains relative to the surrounding unaffected disc surface. Using this technique, the desired information pattern will be written to recording surface 715. With mask 720, multiple magnetic domains can be written at one time. In an alternative embodiment, mask 720 is in contact with recording surface 715.

Figure 16:
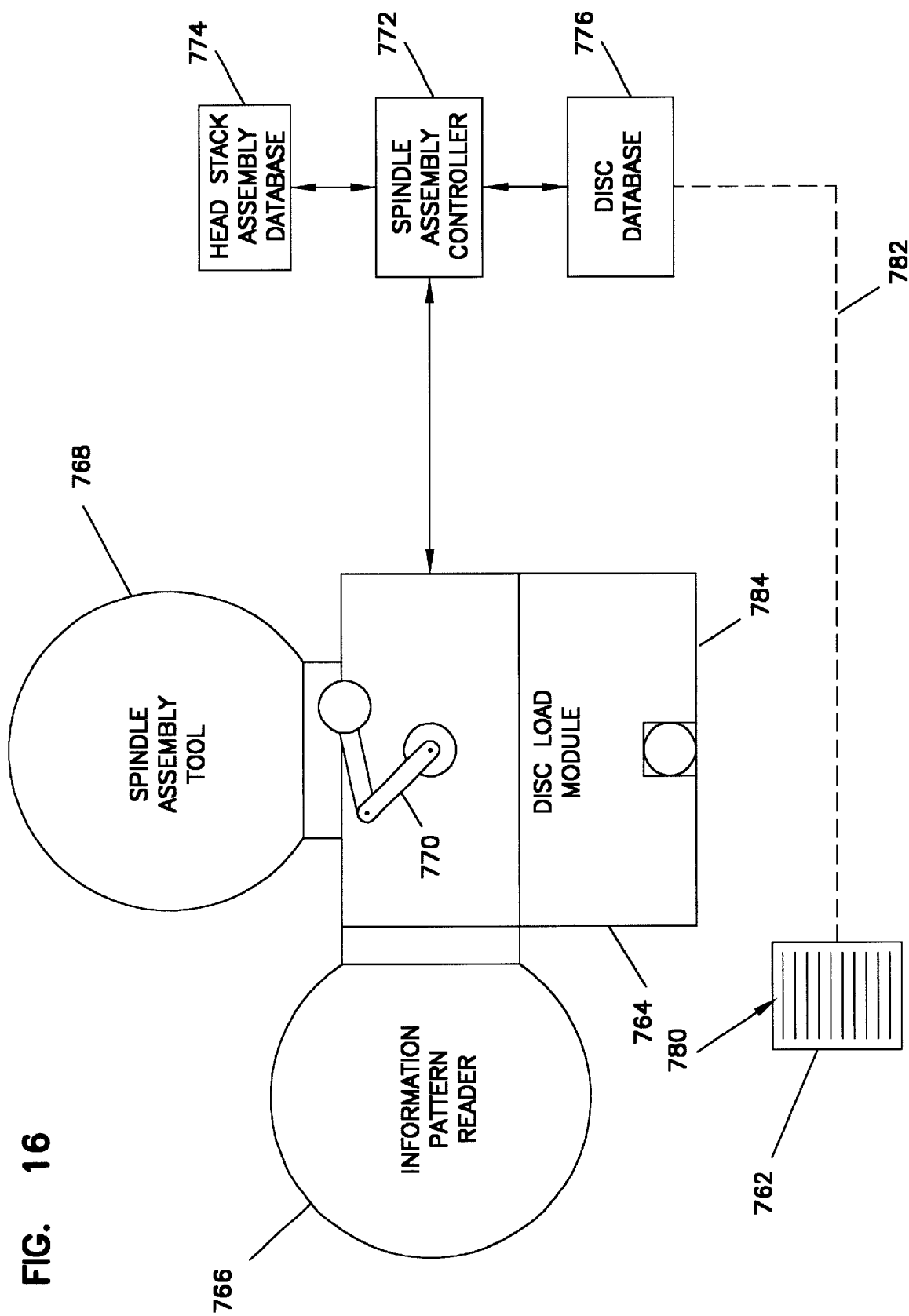
FIG. 16 is a diagram which schematically illustrates a spindle assembly apparatus according to one embodiment of the present invention.

FIG. 16 is a diagram which schematically illustrates a spindle assembly apparatus 760 according to one embodiment of the present invention. Apparatus 760 includes disc caddy 762, disc load module 764, information pattern reader 766, spindle assembly tool 768, disc handling arm 770, controller 772, head stack assembly database 774 and disc database 776. Disc caddy 760 carries a plurality of magnetic discs 780, which are provided to disc load module 764, through port 784. Each recording surface of discs 780 has an information pattern written within the surface according to the present invention. This information pattern can include the magnetic properties of the recording surface or a serial number uniquely identifying the recording surface. If the magnetic properties themselves are not written on the recording surfaces, these properties are stored in a disc database 776, which is associated with the plurality of discs 780. This association is represented by dashed line 782. For each of the discs 780, database 776 includes the serial numbers of each recording surface and the corresponding magnetic properties of that recording surface. For example, database 776 can be formatted as a lookup table in which each serial number is associated with corresponding magnetic properties.

During operation, disc handling arm 770 retrieves one of the discs 780 from disc load module 764 and passes the disc to information pattern reader 766. Information pattern reader 766 decodes the information pattern from each recording surface of the disc and passes the information patterns to controller 772. The information pattern can be decoded in several ways. One method is to read back the information pattern by reflecting a laser beam off of the recording surface and using the Kerr effect to detect rotation in the polarization of the beam induced by the thermally written magnetic domains. Another method is to place the retrieved disc on a spin stand and then read the magnetically encoded information pattern through a magnetic read head as the disc is rotated relative to the head. In this embodiment, the information pattern can be formatted during the thermal writing process to appear as standard magnetically written information, as that shown in FIGS. 8–11, for example.

Based on the information pattern read by reader 766, controller 772 retrieves corresponding magnetic properties from disc database 776 and compares these properties with the magnetic properties of the recording head with which the disc is to be paired. The magnetic properties of the recording heads are stored in head stack database 774. Recording heads are often mounted in head stack assemblies in which one or more recording heads are supported by individual suspensions. An example of a head stack assembly is shown in FIG. 1. The head stack assembly is carried by actuator 116 and includes sliders 110, suspensions 112 and track accessing arms 114. Each recording head is paired with a respective recording surface on each disc to form a head-disc combination. The structural and magnetic properties of each recording head in the head stack assembly are stored in head stack assembly database 774. As the heads are fabricated, a visually readable serial number is typically written on the leading edge of the slider, opposite to the read and write transducers. This serial number is used to track the properties of each head in database 774.

Controller 772 determines if the resulting head-disc combination would produce a recording system having desired properties based on predetermined criteria and/or input from a user. If so, spindle controller 772 directs arm 770 to provide the selected disc to spindle assembly tool 768. Spindle assembly tool 768 mounts the selected disc on a spindle such that when the spindle assembly is merged with the selected head stack assembly, the recording surfaces of the selected disc are paired with the respective heads in the selected head stack assembly. Arm 770 then retrieves another disc from port 784. If the resulting head-disc combination would have less than a desired performance level, controller 772 instructs arm 770 to return the selected disc to port 784. Arm 770 then selects a different disc from port 784 and provides the disc to information pattern reader 766. This process repeats until a selected number of discs are mounted on the spindle. The spindle can then be merged with the head stack assembly in subsequent production steps. In embodiments in which the magnetic properties themselves are encoded on the surfaces of the discs, disc database 776 is not required. As the magnetic properties are read by information pattern reader 766, the properties are provided directly to controller 772 for comparison with the properties in head stack assembly database 774.

Apparatus 760 therefore selects the particular discs and the order at which each disc is mounted on the spindle to achieve a desired recording performance for each head&disc combination.

FIG. 17 is a flow chart illustrating a disc processing method 800 according to one embodiment of the present invention. Process 800 is performed prior to assembly of the magnetic disc in a disc drive. At step 801, a magnetic characteristic of the recording surface is measured. This magnetic characteristic can include magnetic coercivity, magnetic moment and/or other physical parameters, for example. The measured magnetic characteristic is then stored in an electronic database, at step 802. Within the database, the stored magnetic characteristic is associated with a unique serial number for the recording surface, at step 803. At step 804, the serial number is magnetically encoded as an information pattern within the recording surface. At step 805, the magnetic disc and the associated electronic database are provided to the next stage of the disc drive production process, where the recording surface can eventually be paired with a compatible recording head.

FIG. 18 is a flow chart illustrating a method 810 of pairing a recording head to a recording surface, according to one embodiment of the present invention. At step 811, a recording head is selected for assembly into the disc drive. The discs with which the recording head can be paired are held in a disc caddy, at step 812. At step 813, one of the magnetic discs is retrieved from the disc caddy. The information pattern magnetically encoded on the recording surface or surfaces of the disc is decoded at step 814. The measured magnetic characteristic, which is either included in the information pattern or stored in an associated electronic database, is compared to a magnetic characteristic of the selected recording head. If the resulting head-disc combination would have a desired recording performance, at step 816, the retrieved magnetic disc is mounted on a spindle for assembly in the disc drive with the recording head, at step 818. If the resulting head-disc combination would not have the desired recording performance, at step 816, the retrieved magnetic disc is returned to the disc caddy, at step 817. The process returns to step 813 where another magnetic disc is retrieved from the disc caddy for comparison with the magnetic characteristics of the selected recording head.

This process is repeated until all of the recording heads in the head stack assembly is paired with a compatible recording surface and the spindle is fully assembled and can be merged with the head stack assembly. In one embodiment, the exact magnetic properties of the recording surface are not used for pairing the surface with a suitable head. Rather, each surface is placed in predetermined performance categories, and a category identifier is stored on the recording surface or otherwise associated with a serial number written on the recording surface. This category identifier is then used to match the recording surface with a head that will perform adequately with any recording surface in that category.

In summary, one aspect of the present invention relates to a method 800 of processing a magnetic disc 106, 204, 670, 314, 714 and 780 prior to assembly of the disc in a disc drive storage assembly 100. The method includes measuring a physical characteristic of the magnetic disc 106, 204, 670, 314, 714 and 780 and encoding an information pattern 220, 272, 410–414, 501–503, 602, 604, 651–653, 710–712 within the magnetic disc. The information pattern 220, 272, 410–414, 501–503, 602, 604, 651–653, 710–712 is associated with the measured physical characteristic.

In one embodiment, the method further includes storing the measured physical characteristic in an electronic database 776 and associating the physical characteristic with a unique serial number for the recording surface 715, within the electronic database 776. The serial number is magnetically encoded on the recording surface 715. Alternatively, the measured physical characteristic itself is encoded on the recording surface 715 within the information pattern 220, 272, 410–414, 501–503, 602, 604, 651–653, 710–712. The information pattern 220, 272, 410–414, 501–503, 602, 604, 651–653, 710–712 is encoded by thermally heating a plurality of magnetic domains 220, 272, 410–14, 501–503, 602, 604, 651–653, 710–712 on the recording surface 715 to an elevated temperature with a light beam 212, 312, 672, 732 while exposing the recording surface 715 to a magnetic field 208, 674, 740 having a magnetic field strength that is greater than a magnetic coercivity of the surface 715 at the elevated temperature and is less than the magnetic coercivity at a lower, ambient temperature.

Another aspect of the present invention relates to a method 810 of assembling components of a magnetic disc drive 100. The method includes selecting a recording head 110 for assembly into the disc drive 100, wherein the recording head 110 has a magnetic characteristic. An information pattern 220, 272, 410–414, 501–503, 602, 604, 651–653, 710–712 is read from at least one of a plurality of magnetic discs 106, 204, 670, 314, 714 and 780 prior to assembly of the disc within the disc drive 100. The information pattern 220, 272, 410–414, 501–503, 602, 604, 651–653, 710–712 read from the disc 106, 204, 670, 314, 714 and 780 is associated with a magnetic characteristic of that disc. The magnetic disc 106, 204, 670, 314, 714 and 780 is selected for assembly into the disc drive 100 with the recording head 110 based on a comparison of the magnetic characteristics of the magnetic disc and the recording head. The magnetic disc 106, 204, 670, 314, 714 and 780 and the recording head 110 are then assembled in the disc drive 100 such that the magnetic disc and the recording head form a head-disc combination.

Yet another aspect of the present invention relates to a magnetic disc 106, 204, 670, 314, 714 and 780, which includes a magnetic recording surface 715 having a physical characteristic and an information pattern 220, 272, 410–414, 501–503, 602, 604, 651–653, 710–712 encoded within the magnetic recording surface for association with the physical characteristic.

Yet another aspect of the present invention relates to a magnetic disc assembly kit, which includes a plurality of magnetic discs 106, 204, 670, 314,714 and 780, a plurality of unique serial numbers, a disc caddy 762 and an electronic database 766. Each magnetic disc 106, 204, 670, 314, 714 and 780 has a magnetic recording surface 715, which has a measurable magnetic characteristic. Each serial number is magnetically encoded on the recording surface 715 of a respective one of the magnetic discs 106, 204, 670, 314, 714 and 780 and uniquely identifies the recording surface. The disc caddy 762 carries the plurality of magnetic discs 106, 204, 670, 314, 714 and 780. The electronic database 776 associates the plurality of unique serial numbers with the magnetic characteristics of the respective recording surfaces 715.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, various types of information patterns can be thermally or otherwise written to the disc surface in accordance with the present invention. The disc can be a traditional magnetic disc or a magneto-optical disc, for example. Various types of recording heads can be used, such as inductive heads and magneto-resistive heads. Also, various types of light sources, beam deflectors or scanners, magnetic field sources can be used with the invention. The particular process steps and order of steps can be modified as desired. Other modifications can also be made.

What is claimed is:

1. A method of processing a magnetic disc prior to assembly of the disc in a disc drive storage assembly, the method comprising steps of:

(a) measuring a physical characteristic of a recording surface on the magnetic disc;

(b) storing the physical characteristic measured in step (a) in an electronic database;

(c) encoding an information pattern within the recording surface prior to assembly of the disc in the disc drive; and (d) associating the physical characteristic with the information pattern within the electronic database.

2. The method of claim 1 wherein:

step (d) comprises associating the physical characteristic with a unique serial number for the recording surface, within the electronic database, wherein the encoding step (c) comprises magnetically encoding the serial number on the recording surface.

3. The method of claim 1 wherein the encoding step (c) comprises:

(c)(1) magnetically encoding the information pattern on the recording surface.

4. The method of claim 1 wherein the encoding step (c) comprises:

(c)(1) thermally heating a plurality of magnetic domains on the recording surface to an elevated temperature with a light beam while exposing the recording surface to a magnetic field having a magnetic field strength that is greater than a magnetic coercivity of the surface at the elevated temperature and is less than the magnetic coercivity at a lower, ambient temperature.

5. The method of claim 1 wherein the measuring step (a) comprises measuring a magnetic characteristic of the recording surface, and the encoding step (c) comprises encoding an information pattern within the recording surface, which is associated with the magnetic characteristic.

6. A method of assembling components of a magnetic disc drive, the method comprising steps of:

(a) selecting a recording head for assembly into the disc drive, wherein the recording head comprises a magnetic characteristic;

(b) reading an information pattern from at least one of a plurality of magnetic discs prior to assembly of the disc within the disc drive, wherein the information pattern read from the disc is associated with a magnetic characteristic of that disc;

(c) selecting the magnetic disc for assembly into the disc drive with the recording bead based on a comparison of the magnetic characteristics of the magnetic disc and the recording head; and (d) assembling the magnetic disc and the recording head in the disc drive such that the magnetic disc and the recording head form a head-disc combination.

7. The method of claim 6 wherein the information pattern is magnetically encoded on the magnetic disc and the reading step (b) comprises:

(b)(1) reflecting a polarized light beam off of the disc and detecting rotation of the polarized light beam induced by the magnetically encoded information pattern.

8. The method of claim 6 wherein the information pattern is magnetically encoded on the magnetic disc and the reading step (b) comprises:

(b)(1) mounting the magnetic disc on a spin stand, which includes a magnetic read head and is adapted to rotate the magnetic disc relative to the magnetic read head, and (b)(2) reading the magnetically encoded information pattern through the magnetic read head.

9. The method of claim 6 wherein the information pattern is magnetically encoded on the magnetic disc and represents a measure of the magnetic characteristic of the magnetic disc and wherein the reading step (b) comprises:

(b)(1) decoding the measure of the magnetic characteristic from the magnetically encoded information pattern; and (b)(2) comparing the decoded measure of the magnetic characteristic with the magnetic characteristic of the recording head.

10. The method of claim 6 wherein the information pattern is magnetically encoded on the magnetic disc and represents a unique serial number for the magnetic disc and wherein the reading step (b) comprises:

(b)(1) decoding the unique serial number from the magnetically encoded information pattern; and (b)(2) retrieving the magnetic characteristic of the magnetic disc from an electronic database based on the serial number; and (b)(3) comparing the decoded magnetic characteristic of the magnetic disc retrieved from the electronic database with the magnetic characteristic of the recording head.

11. The method of claim 6 wherein:

step (b) of reading an information pattern from at least one of a plurality of magnetic discs comprises:

(b)(1) holding the plurality of magnetic discs in a disc caddy;

(b)(2) retrieving a first of the plurality of magnetic discs from the disc caddy;

(b)(3) reading the information pattern from the first magnetic disc; and (b)(4) comparing the magnetic characteristic of the first magnetic disc that is associated with the information pattern to the magnetic characteristic of the recording head; and step (c) of selecting the magnetic disc comprises:

(c)(1) placing the first magnetic disc on a spindle for assembly in the disc drive as part of the head-disc combination or returning the first magnetic disc to the disc caddy, based on the comparing step (b)(4); and (c)(2) repeating the reading step (b) and the selecting step (c) for a second one of the plurality of magnetic discs if the first magnetic disc is returned to the disc caddy in step (c)(1).

12. The method of claim 6 and further comprising:

(e) magnetically encoding the information pattern within a recording surface of the magnetic disc, prior to reading the information pattern in step (b).

13. The method of claim 12 wherein the magnetically encoding step (e) comprises:

(e)(1) exposing the recording surface to a magnetic field having a magnetic field strength that is less than a magnetic coercivity of the surface at an ambient temperature and greater than the magnetic coercivity at an elevated temperature; and (e)(2) thermally writing a plurality of magnetic domains on the recording surface by individually heating each magnetic domain to the elevated temperature with a light beam while exposing the recording surface to the magnetic field.

14. The method of claim 12 wherein the magnetically encoding step (e) comprises:

(e)(1) exposing the recording surface to a magnetic field having a magnetic field strength that is less than a magnetic coercivity of the surface at an ambient temperature and greater than the magnetic coercivity at an elevated temperature;

(e)(2) exposing areas of the recording surface to a light beam through a pattern mask, wherein the exposed areas are heated to the elevated temperature while the recording surface is exposed to the magnetic field; and (e)(3) removing the light beam from the exposed areas after the exposed areas are heated to the elevated temperature.

15. A magnetic disc comprising:

a first magnetic recording surface, which comprises a physical characteristic and a first information pattern, encoded within the first magnetic recording surface; and means for associating the physical characteristic with the first information pattern in an electronic database.

16. The magnetic disc of claim 15 wherein the first information pattern comprises a serial number, which uniquely identifies the first magnetic recording surface.

17. The magnetic disc of claim 15 wherein the first information pattern comprises a numerical representation of the physical characteristic.

18. The magnetic disc of claim 15 and further comprising:

a second magnetic recording surface, which is opposite to the first magnetic recording surface and comprises a physical characteristic and a second information pattern encoded within the second magnetic recording surface; and means for associating the physical characteristic of the second magnetic recording surface with the second information pattern within the electronic database.

19. The magnetic disc of claim 15 wherein the physical characteristic comprises a magnetic characteristic of the first recording surface.

20. A magnetic disc assembly kit comprising:

a plurality of magnetic discs, wherein each magnetic disc comprises a magnetic recording surface, which has a measurable magnetic characteristic;

a plurality of unique serial numbers, wherein each serial number is magnetically encoded on the recording surface of a respective one of the magnetic discs and uniquely identifies the recording surface;

a disc caddy, which carries the plurality of magnetic discs; and an electronic database which associates the plurality of unique serial numbers with the magnetic characteristics of the respective recording surfaces.

* * * * *